United States Patent
Coffin

(10) Patent No.: US 9,556,894 B2
(45) Date of Patent: Jan. 31, 2017

(54) TIE BOLT EMPLOYING DIFFERENTIAL THREAD

(71) Applicant: James B Coffin, Windsor, CT (US)

(72) Inventor: James B Coffin, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 91 days.

(21) Appl. No.: 14/458,467

(22) Filed: Aug. 13, 2014

(65) Prior Publication Data

US 2014/0348577 A1   Nov. 27, 2014

Related U.S. Application Data

(63) Continuation of application No. 13/290,370, filed on Nov. 7, 2011, now Pat. No. 8,875,378.

(51) Int. Cl.
| | |
|---|---|
| *F16B 35/00* | (2006.01) |
| *F16B 35/04* | (2006.01) |
| *F01D 5/02* | (2006.01) |
| *B23P 11/00* | (2006.01) |
| *F16B 5/02* | (2006.01) |

(52) U.S. Cl.
CPC ............... *F16B 35/04* (2013.01); *F01D 5/026* (2013.01); *F16B 5/0275* (2013.01); *F05D 2260/31* (2013.01); *Y10T 29/49947* (2015.01); *Y10T 29/49963* (2015.01); *Y10T 403/56* (2015.01)

(58) Field of Classification Search
CPC ......... F16B 35/04; F16B 35/005; F16B 33/02; F01D 5/026; F01D 1/02; F01D 1/06; Y10T 403/56; Y10T 403/581; Y10T 403/7033; Y10T 403/32598; Y10T 29/49947; Y10T 29/49963

USPC . 403/299; 416/204 R, 244 A, 198 A, 198 R; 411/388, 389, 395, 413; 29/525.01, 525.11

See application file for complete search history.

(56) References Cited

U.S. PATENT DOCUMENTS

| | | | | |
|---|---|---|---|---|
| 3,602,535 A | * | 8/1971 | Behning | F01D 5/026 403/118 |
| 3,631,688 A | * | 1/1972 | Quick | F01D 5/026 403/316 |
| 3,874,824 A | | 4/1975 | Cronstedt et al. | |
| 3,900,270 A | * | 8/1975 | Rhodes | F01D 5/026 403/317 |
| 3,970,398 A | * | 7/1976 | Wilson | F01D 5/026 403/13 |
| 4,804,288 A | * | 2/1989 | Tiernan, Jr. | F01D 5/026 403/24 |
| 5,537,814 A | * | 7/1996 | Nastuk | F01D 5/066 60/796 |
| 5,580,183 A | * | 12/1996 | Brackoneski | F01D 5/026 403/24 |

(Continued)

OTHER PUBLICATIONS

European Search Report for EP Application No. 12190443.7 dated Sep. 16, 2016.

*Primary Examiner* — Essama Omgba
(74) *Attorney, Agent, or Firm* — Bachman & LaPointe, P.C.

(57) ABSTRACT

A tie bolt for joining two parts together has a shaft. The shaft in turn has a primary thread for engaging a first part and a secondary thread for engaging a second part, wherein the primary thread and the secondary thread have different pitches. The tie bolt may be used to join together any two parts which are to be locked together to transmit torque.

12 Claims, 2 Drawing Sheets

(56) References Cited

U.S. PATENT DOCUMENTS

| | | | | |
|---|---|---|---|---|
| 6,276,124 B1* | 8/2001 | Soh | ............ | F01D 5/026 415/216.1 |
| 7,452,188 B2* | 11/2008 | Bouchard | ............... | F01D 5/066 416/204 R |
| 7,736,083 B2* | 6/2010 | Lescure | ................ | F01D 5/026 403/359.1 |
| 7,811,052 B2* | 10/2010 | Guihard | ................ | F01D 5/026 415/122.1 |
| 7,870,744 B2* | 1/2011 | Galivel | ................ | F01D 5/026 60/792 |
| 8,650,885 B2* | 2/2014 | Reinhardt | ............... | F01D 5/066 415/216.1 |
| 8,794,923 B2* | 8/2014 | Tirone, III | ............. | F01D 5/026 416/198 A |
| 8,875,378 B2* | 11/2014 | Coffin | .................. | F01D 5/026 29/525.01 |
| 8,932,011 B2* | 1/2015 | Mundell | ................ | F01D 5/066 415/198.1 |
| 8,967,977 B2* | 3/2015 | Palmisano | ............. | F01D 25/16 416/244 A |
| 9,121,280 B2* | 9/2015 | Benjamin | ............... | F01D 5/026 |
| 2007/0177935 A1* | 8/2007 | Galivel | ................ | F01D 5/026 403/118 |
| 2007/0212226 A1* | 9/2007 | Guihard | ................ | F01D 5/026 416/244 A |
| 2010/0247234 A1* | 9/2010 | Closs | ...................... | G12B 5/00 403/299 |
| 2012/0107098 A1* | 5/2012 | Tirone, III | ............. | F01D 5/026 415/122.1 |
| 2013/0266421 A1* | 10/2013 | Benjamin | ............... | F01D 5/066 415/122.1 |
| 2014/0348577 A1* | 11/2014 | Coffin | .................. | F01D 5/026 403/299 |

* cited by examiner

TIE BOLT EMPLOYING DIFFERENTIAL THREAD

CROSS REFERENCE TO RELATED APPLICATION

Benefit is claimed of U.S. patent application Ser. No. 13/290,370, filed Nov. 7, 2011, and entitled "Tie Bolt Employing Differential Thread", the disclosure of which is incorporated by reference herein in its entirety as if set forth at length.

BACKGROUND

The present disclosure relates to a tie bolt for engaging two parts, such as two shafts of a gas turbine engine, which tie bolt has two different threads.

Referring to FIG. 1, there is shown an axial load bearing surface 10 of a tie bolt 12 which is used to join together two parts, such as a forward shaft 14 and an aft shaft 16. The axial load bearing surface 10 requires a radial height 18 that limits the minimum bore 20 of another part 22 and also limits the size of a corner fillet 24. Friction of the axial load bearing surface 10 increases the assembly torque required to achieve a desired tensile preload.

The assembly torque advances the tie bolt 12, clamping the forward shaft 14 between the axial load bearing surface 10 and the aft shaft 16 via the primary thread 26.

It may be advantageous if the axial load bearing surface 10 can be eliminated. This may result in a reduction in the radial size of the tie bolt as well as removal of the friction of the axial load bearing surface from the installation torque procedure.

SUMMARY

In accordance with the present disclosure, there is provided a tie bolt for joining two parts together which broadly comprises a shaft having a primary thread for engaging a first part and a secondary thread for engaging a second part, wherein said shaft has a first end which fits into a slot in a tab attached to one of said parts, wherein said primary thread and said secondary thread have different pitches.

Further in accordance with the present invention, there is provided a system for joining parts which broadly comprises a tie bolt having a shaft with a primary thread at one end of said shaft and a secondary thread at an opposite end of said shaft, wherein the primary and secondary threads have different pitches, said primary thread engaging a thread on a first part and said secondary thread engaging a thread on a second part, so that when said tie bolt is rotated said first part moves toward said second part, wherein said second part has a tab attached thereto with a slot in said tab and one end of said shaft engages said slot.

Still further, there is provided a method for joining two parts together which broadly comprises providing a tie bolt having a shaft with a primary thread at one end of said shaft and a secondary thread at an opposite end of said shaft, wherein the primary and secondary threads have different pitches, engaging a first part with said primary thread and engaging a second part with said secondary thread.

Other details of the tie bolt employing differential thread are set forth in the following description and the accompanying drawings wherein like reference numerals depict like elements.

DETAILED DESCRIPTION

Figure 2:
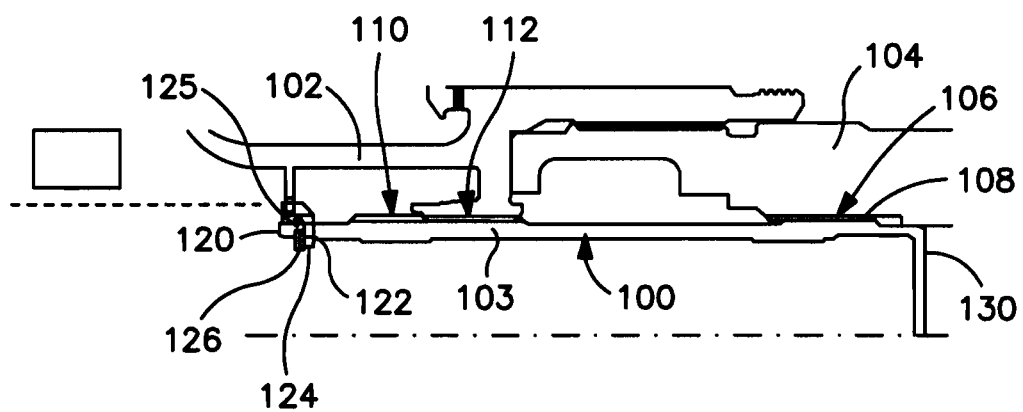
FIG. 2 illustrates a tie bolt having differential threads.

Referring now to FIG. 2, there is shown an embodiment of a tie bolt 100 which can be used in a gas turbine engine in accordance with the present disclosure. The tie bolt 100 can be used to join any two parts 102 and 104 together. The part 102 may be a forward shaft and the part 104 may be an aft shaft which shafts are locked together in order to transmit a torque. For example, the shaft 102 could be an FDGS input coupling shaft and the shaft 104 may be a LP turbine shaft/LP compressor hub sub-assembly.

The tie bolt 100 may be formed from any suitable material known in the art, such as high strength steel, nickel or a nickel alloy, or a titanium alloy.

The tie bolt 100 has a shaft 103 on which there is a primary thread 106, which engages a mating thread 108 on the part 104, and a secondary thread 110, which engages a thread 112 on the part 102. The secondary thread 110 is provided with a different pitch than the primary thread 106. The pitches of the primary and secondary threads 106 and 110 respectively are selected to create an effective pitch for the tie bolt 100 relative to the two parts 102 and 104 that is finer than either the primary or secondary thread pitches. In one embodiment, the pitch of the primary thread is coarse while the pitch of the secondary thread is fine.

Figure 3:
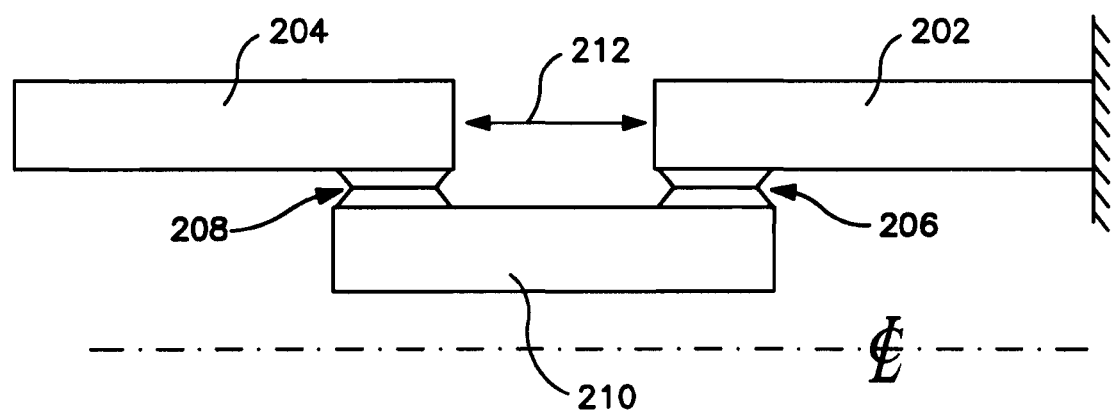
FIG. 3 is a diagrammatic representation of effective pitch.

FIG. 3 illustrates the concept of effective pitch. As can be seen in the drawing, there is a first shaft 202 and a second shaft 204. The shaft 202 is fixed to ground.

Preferably, the shaft 202 is splined or keyed to shaft 204, so there is no relative rotation between shafts 202 and 204. For exemplary purposes, the pitch 206 is 10 TPI (threads per inch) and the pitch 208 is 14 TPI. For every clockwise turn of the bolt 210, the bolt advances $1/10$ inches (1/25.4 cm) relative to shaft 202. For every clockwise turn of the bolt 210, the bolt advances $1/14$ inches (1/35.6 cm) relative to shaft 204. For every clockwise turn of the bolt 210, the shaft 204 advances ($1/10$-$1/14$) inches relative to the shaft 202. So for every clockwise turn of the bolt 210, the gap 212 closes ($1/10$-$1/14$) inches which equals $1/35$ or 0.02857 inches (0.07257 cm). The effective pitch is the inverse of the gap closure (1/0.02857). Thus, in this case, the effective pitch is 35. The Gain is 2.5 (35/14). The Gain is a measure of the mechanical advantage provided by the device. By adjusting the pitches 206 and 208, the Gain may be manipulated to give any desired value. The practical range of the Gain will depend on practical limitations of space and thread manufacturing.

As shown in FIG. 2, the tie bolt 100 has an end 120 of the shaft 103 which fits into a slot 122 in a tab 124 connected to the part 102. The end 120 may be provided with a groove 125 into which a locking element 126 may be inserted. The locking element 126 is held in place by a surface of the tab 124 and an end wall of the groove 125. The shaft 103 may have a substantially constant diameter. Further, as shown in FIG. 2, the shaft 103 has an end 130, opposed to the end 120, which is substantially L-shaped to seal off the forward end from the aft end. If desired, the substantially L-shape end could be omitted and the end 120 could have some other shape.

During installation, the tie bolt 100 may be rotated using any suitable tool known in the art. Rotation of the tie bolt 100 causes the parts 102 and 104 to come together. When the parts 102 and 104 abut each other, rotation of the tie bolt may cease.

Figure 1:
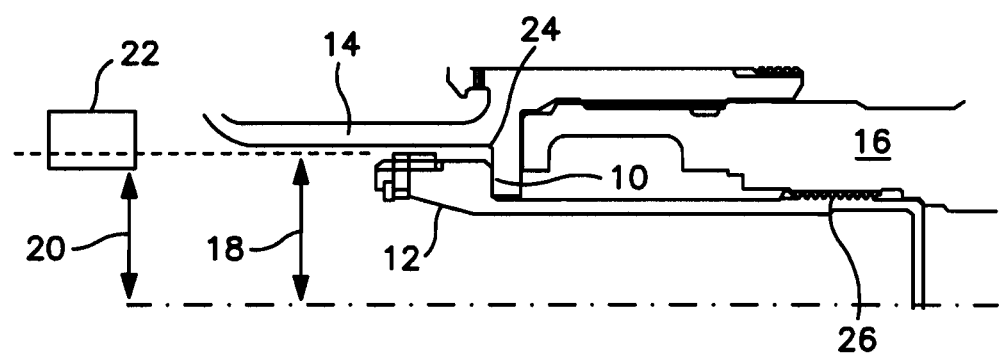
FIG. 1 is a schematic diagram of a prior art tie bolt used in a prior installation.

The tie bolt 100 with the differential thread described herein has a number of benefits. For example, as can be seen from FIGS. 1 and 2, the radial size of the tie bolt can be reduced. Further, the friction of the axial load bearing surface is eliminated. Still further, it is not required to prestretch the tie bolt prior to torqueing. The mechanical advantage of the differential thread results in a dramatically reduced wrenching torque for a given preload, thus improving assembly, tooling design, and assembly ergonomics/safety. The high effective pitch allows for fine adjustment of angle of turn to achieve a more accurate preload. The differential thread disassembles itself when untorqued. No pushing or pulling tool is required.

There has been provided in the present disclosure a tie bolt employing differential thread. While the tie bolt has been described in the context of a particular embodiment thereof, other unforeseen alternatives, modifications, and variations may become apparent to those skilled in the art having read the foregoing description. Accordingly, it is intended to embrace those alternatives, modifications, and variations, as fall within the broad scope of the appended claims.

What is claimed is:

1. A tie bolt in combination with a part having a tab with a slot, said tie bolt for joining two parts together, the tie bolt comprising:
    a shaft; and
    said shaft having a primary thread for engaging a first part and a secondary thread for engaging a second part, said second part having the tab with the slot attached thereto, and one end of said shaft engaging said slot,
    wherein said primary thread and said secondary thread have different pitches.

2. The tie bolt of claim 1, wherein the primary thread is coarse and the secondary thread is fine.

3. The tie bolt of claim 1, wherein the primary thread engages a thread on the first part and the secondary thread engages a thread on the second part.

4. The tie bolt of claim 1, wherein rotation of said tie bolt brings the first and second parts together.

5. The tie bolt of claim 1, wherein said tie bolt has an effective pitch that is finer than the primary thread pitch and the secondary thread pitch.

6. The tie bolt of claim 1, wherein said tie bolt shaft has a substantially constant diameter.

7. A system for joining two parts which comprises a tie bolt in combination with a part having a tab with a slot, said tie bolt having a shaft with a primary thread at one end of said shaft and a secondary thread at an opposite end of said shaft, wherein the primary and secondary threads have different pitches, said primary thread engaging a thread on a first part and said secondary thread engaging a thread on a second part, so that when the tie bolt is rotated said first part moves toward said second part, wherein said second part has the tab with the slot attached thereto and one end of said shaft engages said slot.

8. The system of claim 7, further comprising said primary thread engaging a thread on a first part and said secondary thread engaging a thread on a second part, so that when said tie bolt is rotated said first part moves toward said second part.

9. The system of claim 8, wherein said primary thread has a coarse pitch and said secondary thread has a fine pitch.

10. The system of claim 8, wherein said tie bolt has an effective pitch which is finer than either of the primary and secondary thread pitches.

11. The system of claim 8, further comprising means for securing the tie bolt relative to the second part.

12. The system of claim 8, wherein said first part comprises a first shaft and said second part comprises a second shaft.

* * * * *